(12) United States Patent
Ke et al.

(10) Patent No.: US 9,009,511 B2
(45) Date of Patent: Apr. 14, 2015

(54) POWER SWITCH SYSTEM AND METHOD THEREOF

(71) Applicant: Wistron Corporation, New Taipei (TW)

(72) Inventors: Shang-Te Ke, New Taipei (TW); Hsin-Chieh Yang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 283 days.

(21) Appl. No.: 13/737,918

(22) Filed: Jan. 9, 2013

(65) Prior Publication Data

US 2014/0068292 A1 Mar. 6, 2014

(30) Foreign Application Priority Data

Aug. 31, 2012 (TW) .............................. 101131877 A

(51) Int. Cl.
    *G06F 1/32* (2006.01)
    *G06F 1/30* (2006.01)

(52) U.S. Cl.
    CPC ................ *G06F 1/3234* (2013.01); *G06F 1/30* (2013.01)

(58) Field of Classification Search
    CPC ...................................................... G06F 1/3224
    USPC .................................................. 713/320, 323
    See application file for complete search history.

(56) References Cited

U.S. PATENT DOCUMENTS

| | | | |
|---|---|---|---|
| 5,945,817 A * | 8/1999 | Nguyen | 323/273 |
| 5,998,982 A | 12/1999 | Groeneveld | |
| 8,368,375 B2 | 2/2013 | Liu | |
| 2004/0098632 A1 * | 5/2004 | Ueda | 713/323 |
| 2005/0210302 A1 * | 9/2005 | Kato et al. | 713/320 |
| 2007/0260753 A1 * | 11/2007 | Komatsu et al. | 710/1 |
| 2008/0056049 A1 * | 3/2008 | Moyer et al. | 365/227 |
| 2009/0079401 A1 | 3/2009 | Mok | |
| 2009/0177906 A1 * | 7/2009 | Paniagua et al. | 713/340 |
| 2010/0100752 A1 * | 4/2010 | Chueh et al. | 713/320 |
| 2011/0234183 A1 * | 9/2011 | Noon et al. | 323/271 |
| 2012/0299564 A1 * | 11/2012 | Howes et al. | 323/281 |
| 2012/0299621 A1 * | 11/2012 | Lam et al. | 326/62 |

FOREIGN PATENT DOCUMENTS

| | | |
|---|---|---|
| TW | 525875 | 3/2003 |
| TW | 200929815 | 7/2009 |
| TW | 201108585 | 3/2011 |

OTHER PUBLICATIONS

Office action mailed on Sep. 15, 2014 for the Taiwan application No. 101131877, filing date: Aug. 31, 2012, p. 1 line 10~14, p. 2~5 and p. 6 line 1.

* cited by examiner

*Primary Examiner* — Vincent Tran

(74) *Attorney, Agent, or Firm* — Winston Hsu; Scott Margo

(57) ABSTRACT

A power switch system for a computer system includes a power supply module for generating a system operational power source and a power transistor driving source according to an external power source, a control module for generating a control signal according to a feedback signal, and a power switch module coupled to the power supply module and a control module for adjustably outputting the system operational power source and the power transistor driving source to a power source module, wherein the feedback signal is utilized to determine an operational mode of the computer system to be a high performance operational mode or a power saving operational mode.

18 Claims, 7 Drawing Sheets

POWER SWITCH SYSTEM AND METHOD THEREOF

BACKGROUND OF THE INVENTION

1. Field of the Invention

The present invention relates to a power switch system and a method thereof, and more particularly, to a power switch system and a method thereof which adaptively adjusts a system operational power source and a power transistor driving source via determining an operational mode of a computer system.

2. Description of the Prior Art

Digital products and computer systems equipped with various functions have become necessities in people's daily lives. In such circumstances, it is important to provide stable power sources for normal operation, such as through a stable voltage power supply. Besides, when the digital products and the computer systems enter a sleep mode to stop the normal operation, users want to adaptively switch to a smaller voltage source for reducing power consumption and correspondingly increase conversion efficiency. In that, it is necessary that digital products and computer systems can be awakened again from basic operations to normal operations. However, the prior art has a large power consumption while processing a transitional mechanism, which is inconvenient for users switching between different power sources.

Therefore, it has become an important issue to provide a more efficient power switch system and a method thereof which adaptively adjusts a system operational power source and a power transistor driving source to operate the digital products and the computer systems for the normal operation or the basic operation.

SUMMARY OF THE INVENTION

It is therefore an objective of the invention to provide a power switch system and a method thereof which adaptively adjusts a system operational power source and a power transistor driving source via determining an operational mode of a computer system.

An embodiment of the invention discloses a power switch system for a computer system comprising a power supply module for generating a system operational power source and a power transistor driving source according to an external power source, a control module for generating a control signal according to a feedback signal, and a power switch module coupled to the power supply module and a control module for adjustably outputting the system operational power source and the power transistor driving source to a power source module, wherein the feedback signal is utilized to determine an operational mode of the computer system to be a high performance operational mode or a power saving operational mode.

An embodiment of the invention also discloses another power switch method for a computer system comprising generating a system operational power source and a power transistor driving source according to an external power source, generating a control signal according to a feedback signal, and adjustably outputting the system operational power source and the power transistor driving source to a power source module, wherein the feedback signal is utilized to determine an operational mode of the computer system to be a high performance operational mode or a power saving operational mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
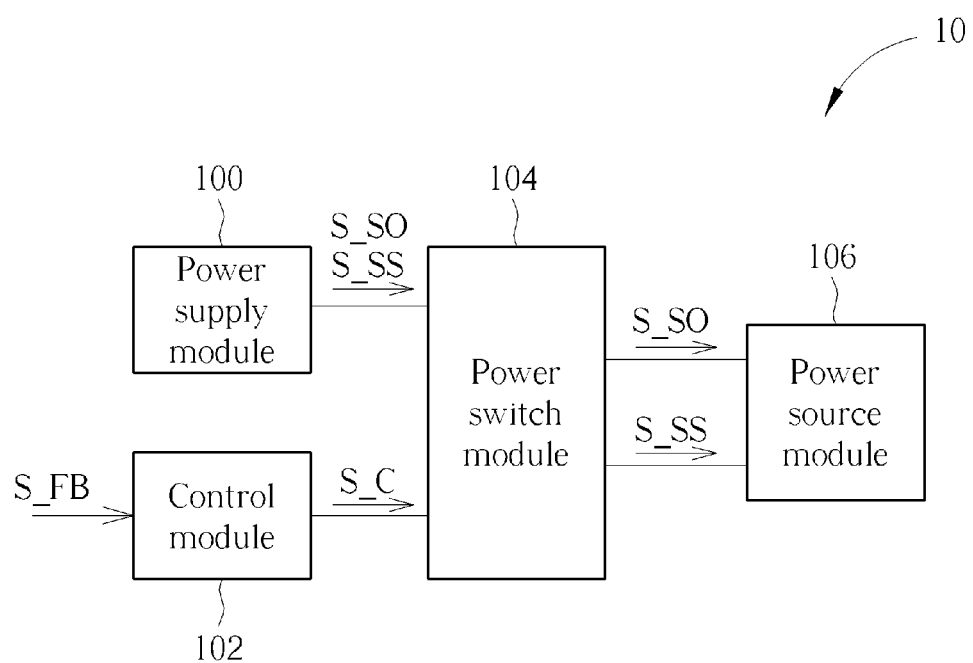
FIG. 1 illustrates a schematic diagram of a power switch system according to an embodiment of the invention.

Please refer to FIG. 1, which illustrates a schematic diagram of a power switch system 10 according to an embodiment of the invention, wherein the power switch system 10 is disposed in a computer system (not shown in the figure) or coupled to the computer system, such that the power switch system 10 can operate the computer system in a high performance operational mode or in a power saving operational mode. As shown in FIG. 1, the power switch system 10 comprises a power supply module 100, a control module 102, a power switch module 104 and a power source module 106. The power supply module 100 receives an external power source (not shown in the figure) to generate a system operational power source S_SO and a power transistor driving source S_SS. The control module 102 generates a control signal S_C to the power switch module 104 according to a feedback signal S_FB . The power switch module 104 is coupled to the power supply module 100 and the control module 102 for receiving the system operational power source S_SO, the power transistor driving source S_SS and the control signal S_C, and adjustably outputs the system operational power source S_SO and the power transistor driving source S_SS to the power source module 106 via the control signal S_C. The power source module 106 is realized via a buck converter for transforming the system operational power source S_SO and the power transistor driving source S_SS into proper power sources complying with different requirements of power source modules disposed inside the computer system. Additionally, the power source module 106 shown in FIG. 1 is demonstrated with single power source supply 106, and those skilled in the art can adaptively adjust the number of the power source supplies 106, which is not limiting the scope of the invention.

In simple, the embodiment of the invention utilizes elements/modules inside the computer system to correspondingly generate different feedback signals S_FB representing a current operational mode of the computer system, and the control module 102 recognizes the operational mode of the computer system (i.e. determining the computer system to be in the high performance operational mode or the power saving operational mode) to correspondingly output the control signal S_C to control the power switch module 104 for adjustably outputting the system operational power source $S_{13}$ SO and the power transistor driving source S_SS. Under such circumstances, the computer system can be adaptively operated with different operational voltages to maintain a higher power conversion efficiency of the computer system, so as to prevent unnecessary power consumption.

Figure 2:
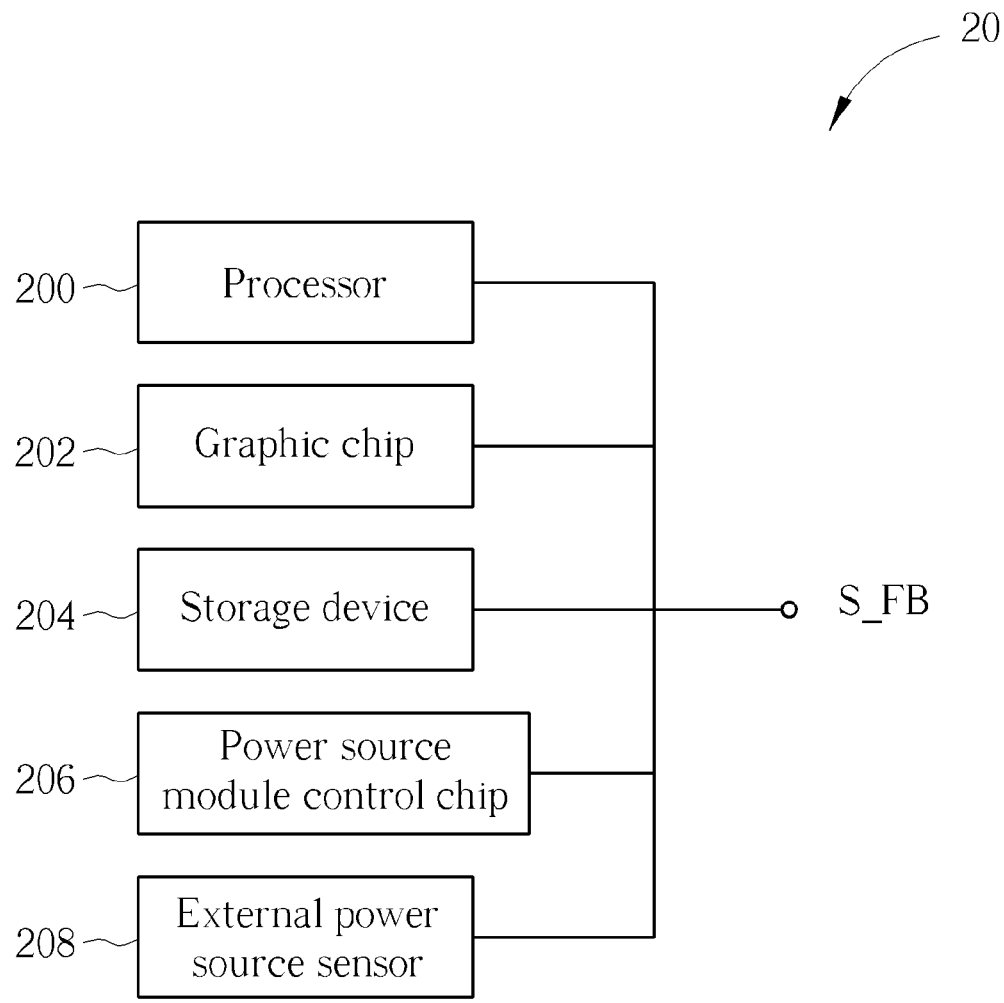
FIG. 2 illustrates a schematic diagram of feedback module according to an embodiment of the invention.

Please refer to FIG. 2, which illustrates a schematic diagram of a feedback module 20 according to an embodiment of the invention. As shown in FIG. 2, the feedback module 20 is coupled to the control module 102 to correspondingly provide the feedback signal S_FB. The feedback module 20 comprises at least a processor 200, a graphic chip 202, a storage device 204 (such as DDR or DIMM), a power source module control chip 206 and an external power source sensor 208. For clear description, the embodiment of the invention integrates the processor 200, the graphic chip 202, the storage device 204 and the power source module control chip 206 originally disposed inside the computer system with the external power source sensor 208 disposed outside the computer system to be the feedback module 20. Certainly, those skilled in the art can utilize the control module 102 to directly receive the feedback signal S_FB from the processor 200, the graphic chip 202, the storage device 204, the power source module control chip 206 or the external power source sensor 208, which is also in the scope of the invention.

In detail, all the processor 200, the graphic chip 202, the storage device 204, the power source module control chip 206 comprise a power status register 32$h$ (not shown in the figure) to correspondingly store a currently operational mode thereof, and accordingly, an internal integrated circuit transmission interface, a serial peripheral interface, a power management bus, a system management bus or an SVID bus is utilized to transmit the feedback signal S_FB. Certainly, those skilled in the art can adaptively modify the above transmission operation for simultaneously utilizing all the transmission interfaces (buses) to finish a wireless/wired transmission of the feedback signal S_FB, which is not limited in the scope of the invention. Preferably, the power status register 32$h$ comprises a P0 mode, a P1 mode, a P2 mode and a P3 mode to correspondingly utilize a 00h format, a 01h format, a 02h format and a 03h format, so as to process the transmission operation of the feedback signal S_FB. When the operational mode is the P0 mode (i.e. the 00h format) or the P1 mode (i.e. the 01h format), the control module 102 will determine the computer system to be in the high performance operational mode. When the operational mode is the P2 mode (i.e. the 02h format) or the P3 mode (i.e. the 03h format), the control module 102 will determine the computer system to be in the power saving operational mode. Accordingly, the control signal S_C is generated.

Furthermore, the external power source sensor 208 is realized via a precision resistor (not shown in the figure) and an analog-to-digital converter (not shown in the figure) to detect values of the external power source provided for the power supply module 100. Accordingly, the values of the external power source are compared with a predetermined threshold stored in a register (not shown in the figure) of the external power source sensor 208 to determine whether the computer system is in the high performance operational mode or in the power saving operational mode. Certainly, those skilled in the art can combine the external power source sensor 208 with other voltage/current converters or pre-store a look-up table in the register of the external power source sensor 208, such that the external power source sensor 208 can adaptively determine the computer system to be in the high performance operational mode or in the power saving operational mode according to the inputted external power source, which is also in the scope of the invention.

In simple, the feedback module 20 of the invention retrieves all signals indicating the operational modes of the computer system to determine the current operational mode of the computer system, so as to generate the feedback signal S_FB to the control module 102 and make the power switch module 104 adjustably output the system operational power source S_SO and the power transistor driving source S_SS. Thus, those skilled in the art can adaptively modify conceptions of the embodiment of the invention to other electronic digital devices to correspondingly determine the operational mode of the feedback signal S_FB, so as to switch between the system operational power source S_SO and the power transistor driving source S_SS, which is also in the scope of the invention. Noticeably, in the embodiment, when the computer system is determined to be in the high performance operational mode, the feedback signal S_FB is a low level signal and the power switch module 104 correspondingly outputs the system operational power source S_SO as 12 volts and the power transistor driving source S_SS as 8 volts. When the computer system is determined to be in the power saving operational mode, the feedback signal S_FB is a high level signal and the power switch module 104 correspondingly outputs the system operational power source S_SO as 8 volts and the power transistor driving source S_SS as 5 volts. In other words, the embodiment of the invention provides the switch mechanism for adjustable generation of the system operational power source S_SO and the power transistor driving source S_SS, such that the computer system can be adaptively operated at different input voltage sources to increase the power conversion efficiency as well as to decrease the power consumption. Certainly, the mentioned values of the embodiment are exemplified for explanation and are not limiting the scope of the invention.

Figure 3:
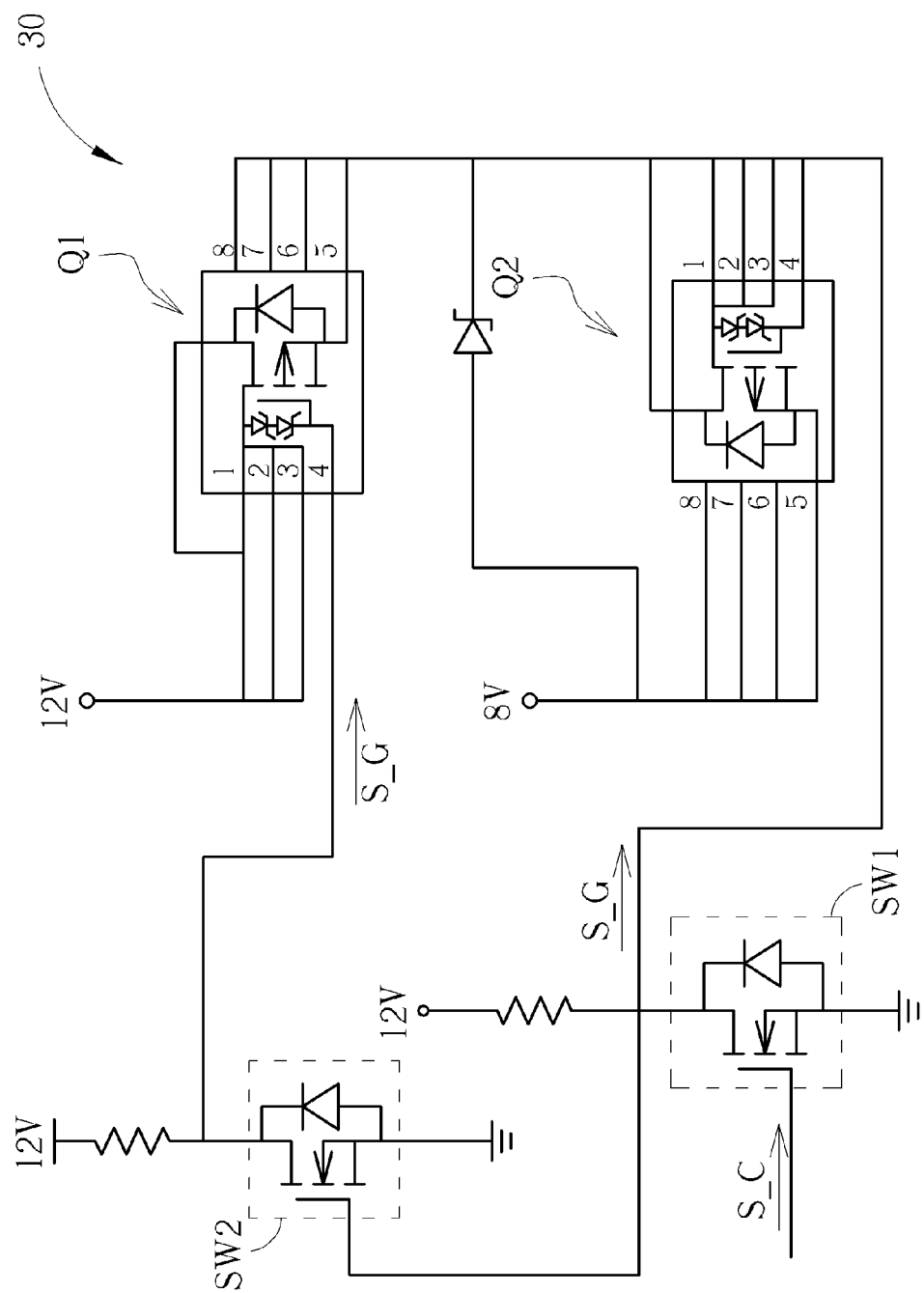
FIG. 3 illustrates a detailed schematic diagram of a system operational power source transformation unit according to an embodiment of the invention.
Figure 4:
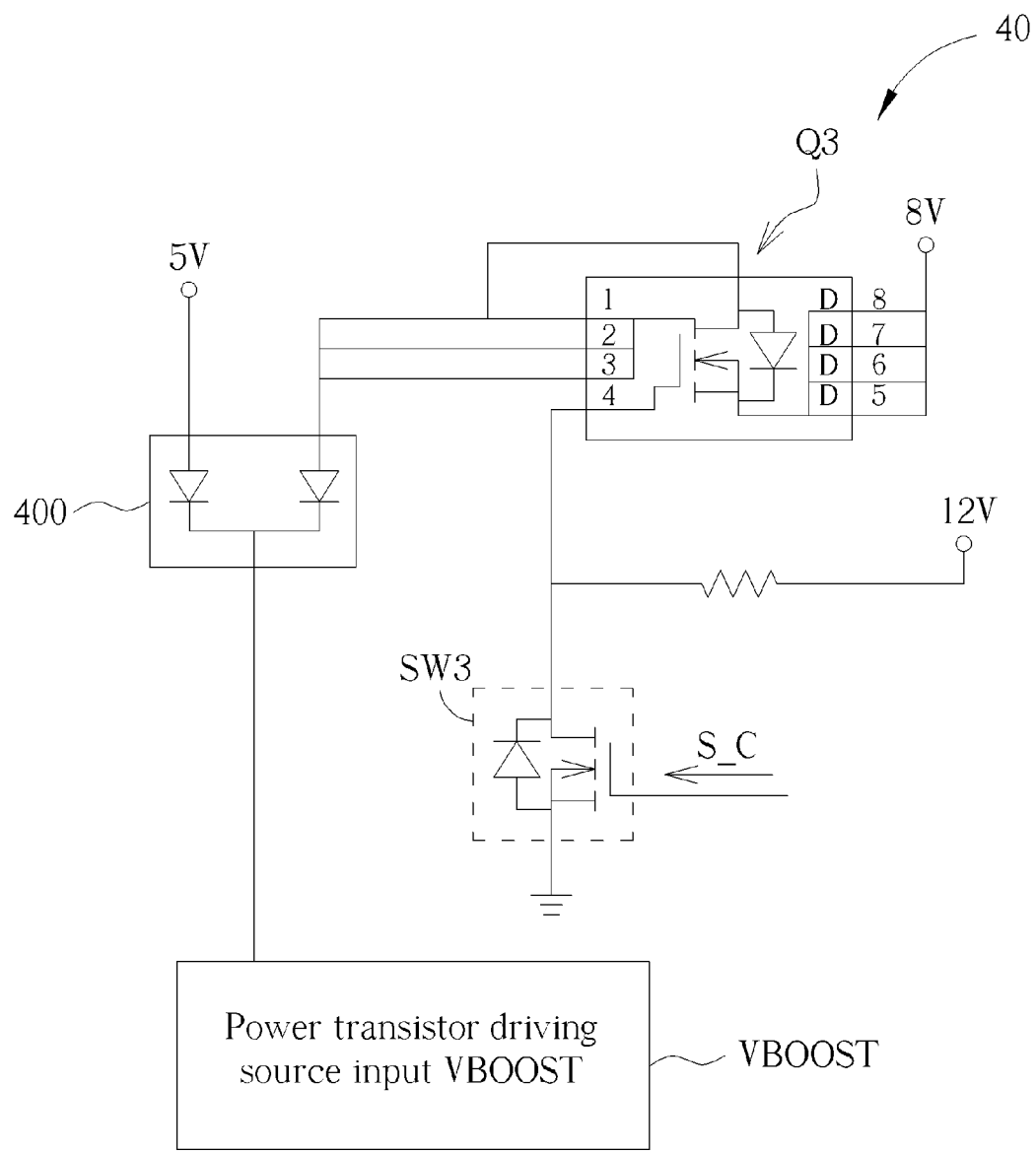
FIG. 4 illustrates a detailed schematic diagram of a power transistor driving source transformation unit according to an embodiment of the invention.

The power switch module 104 of the invention further comprises a system operational power source transformation unit and a power transistor driving source transformation unit. Please refer to FIG. 3 and FIG. 4, wherein FIG. 3 illustrates a detailed schematic diagram of the system operational power source transformation unit 30 according to an embodiment of the invention, and FIG. 4 illustrates a detailed schematic diagram of the power transistor driving source transformation unit 40 according to an embodiment of the invention. As shown in FIG. 3, the system operational power source transformation unit 30 receives the control signal S_C to control conduction conditions of switch transistors SW1, SW2. Based on the conduction conditions of switch transistors SW1, SW2, another control signal S_G is correspondingly generated to control conduction conditions of P-type MOS transistors Q1, Q2, so as to switch the system operational power source transformation unit 30 for outputting the system operational power source S_SO as 12 volts or 8 volts. In the embodiment, when the control signal S_C is at the high level signal, the P-type MOS transistor Q1 is turned off and the P-type MOS transistor Q2 is turned on, and the system operational power source transformation unit 30 outputs the system operational power source S_SO as 8 volts. When the control signal S_C is at the low level signal, the P-type MOS transistor Q1 is turned on and the P-type MOS transistor Q2 is turned off, and the system operational power source transformation unit 30 outputs the system operational power source S_SO as 12 volts.

Please refer to FIG. 4 again. The power transistor driving source transformation unit 40 is coupled to a power transistor driving source input VBOOST of a conventional power control module. In the embodiment, as driven by the power transistor driving source S_SS, transistors utilized in the computer system of the invention have higher conductive voltages which decreases related resistances to improve the power conversion efficiency of power source, so as to avoid power consumption of the computer system. In detail, the power transistor driving source transformation unit 40 receives the control signal S_C to correspondingly control a conduction condition of the switch transistor SW3, so as to turn on/off an N-type MOS transistor Q3. A switch unit 400 is realized via two transistors coupled to the N-type MOS transistor Q3 and a stable power source of 5 volts, respectively, to outputs 8 volts or 5 volts to a bootstrap capacitor C and a bootstrap resistor R. In the embodiment, when the control signal S_C is the high level signal, the N-type MOS transistor Q3 is turned off and the power transistor driving source transformation unit 40 outputs the power transistor driving source S_SS as 5 volts. When the control signal S_C is the low level signal, the N-type MOS transistor Q3 is turned on and the power transistor driving source transformation unit 40 outputs the power transistor driving source S_SS as 8 volts.

Figure 5:
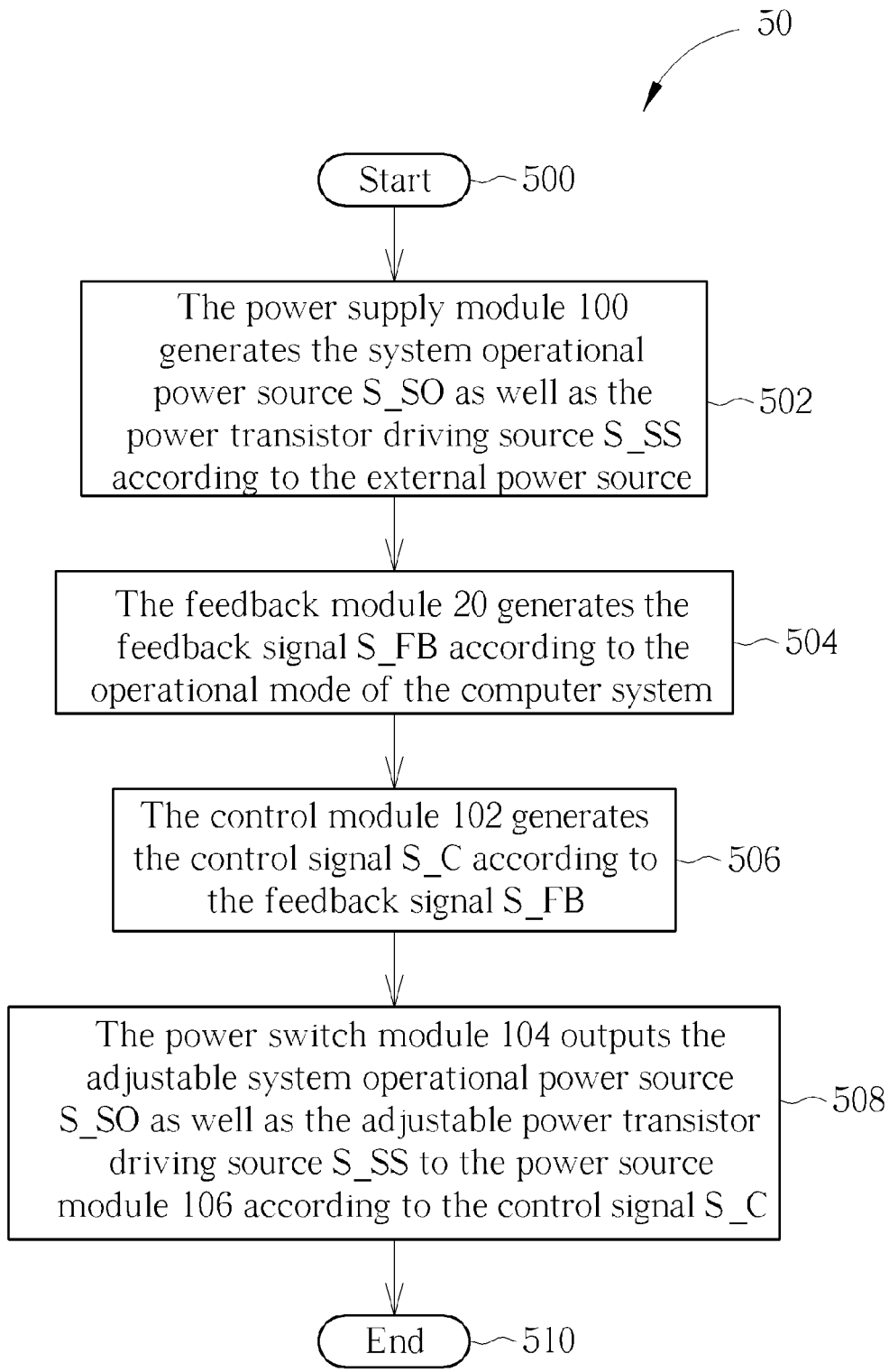
FIG. 5 illustrates a flow chart of a power switch process according to an embodiment of the invention.

Noticeably, the system operational power source transformation unit 30 and the power transistor driving source transformation unit 40 of the invention receive the stable power source from the power supply module 100, such as 12 volts, 8 volts and 5 volts in the embodiment, and are controlled via the control signal S_C to correspondingly output the adjustable system operational power source S_SO as well as the adjustable power transistor driving source S_SS. Further, the power switch system 10 of the invention integrated with the computer system is operated via a power switch method which can be summarized as a power switch process 50, as shown in FIG. 5. The power switch process 50 includes the following steps.

Step 500: Start.

Step 502: The power supply module 100 generates the system operational power source S_SO as well as the power transistor driving source S_SS according to the external power source.

Step 504: The feedback module 20 generates the feedback signal S_FB according to the operational mode of the computer system.

Step 506: The control module 102 generates the control signal S_C according to the feedback signal S_FB.

Step 508: The power switch module 104 outputs the adjustable system operational power source S_SO as well as the adjustable power transistor driving source S_SS to the power source module 106 according to the control signal S_C.

Step 510: End

Figure 6:
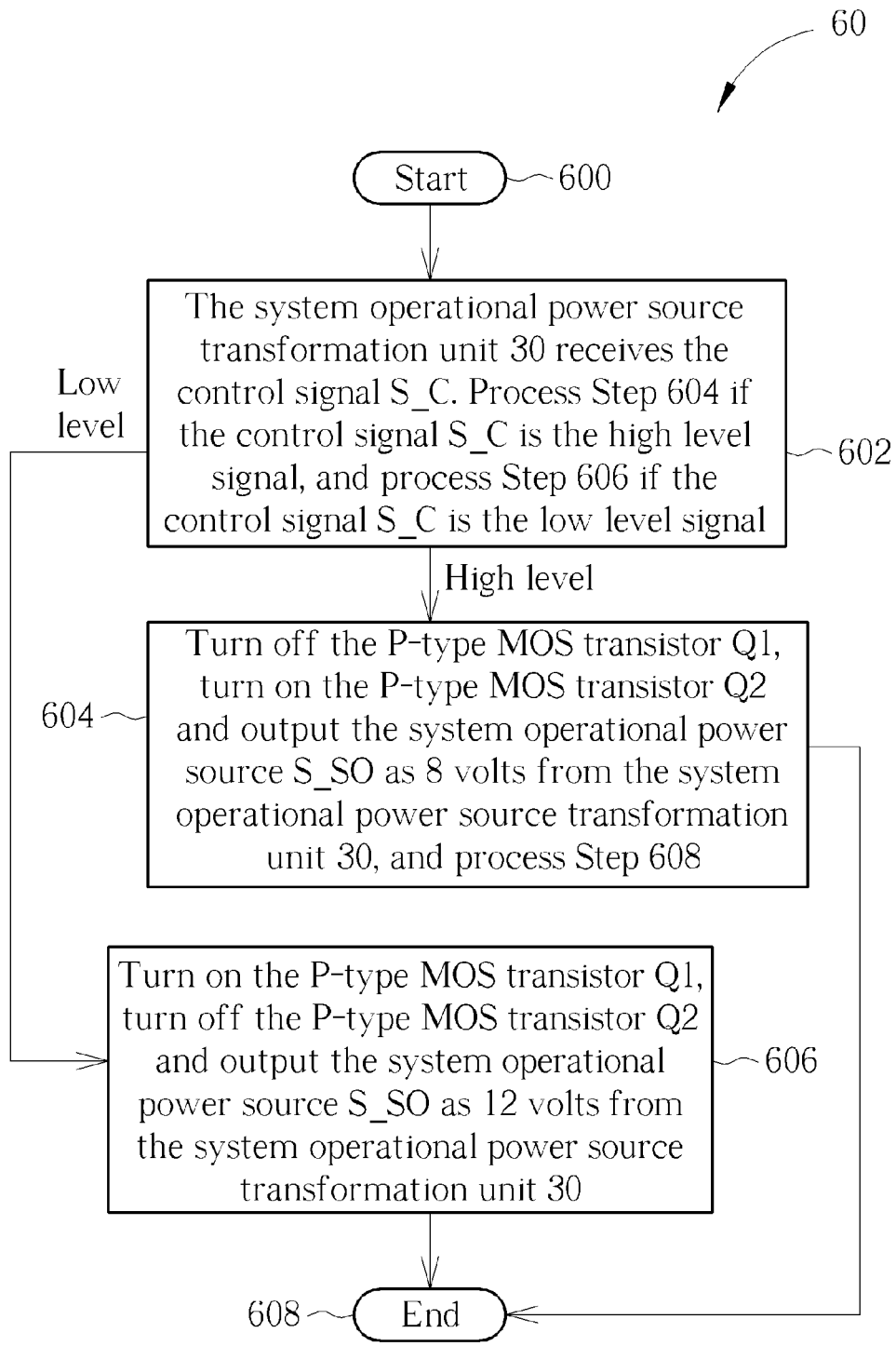
FIG. 6 illustrates a flow chart of a system operational power source transformation process according to an embodiment of the invention.

Further, operations of the system operational power source transformation unit 30 can be summarized as a system operational power source transformation process 60, as shown in FIG. 6. The system operational power source transformation process 60 includes the following steps.

Step 600: Start.

Step 602: The system operational power source transformation unit 30 receives the control signal S_C. Process Step 604 if the control signal S_C is the high level signal, and process Step 606 if the control signal S_C is the low level signal.

Step 604: Turn off the P-type MOS transistor Q1, turn on the P-type MOS transistor Q2 and output the system operational power source S_SO as 8 volts from the system operational power source transformation unit 30, and process Step 608.

Step 606: Turn on the P-type MOS transistor Q1, turn off the P-type MOS transistor Q2 and output the system operational power source S_SO as 12 volts from the system operational power source transformation unit 30.

Step 608: End.

Figure 7:
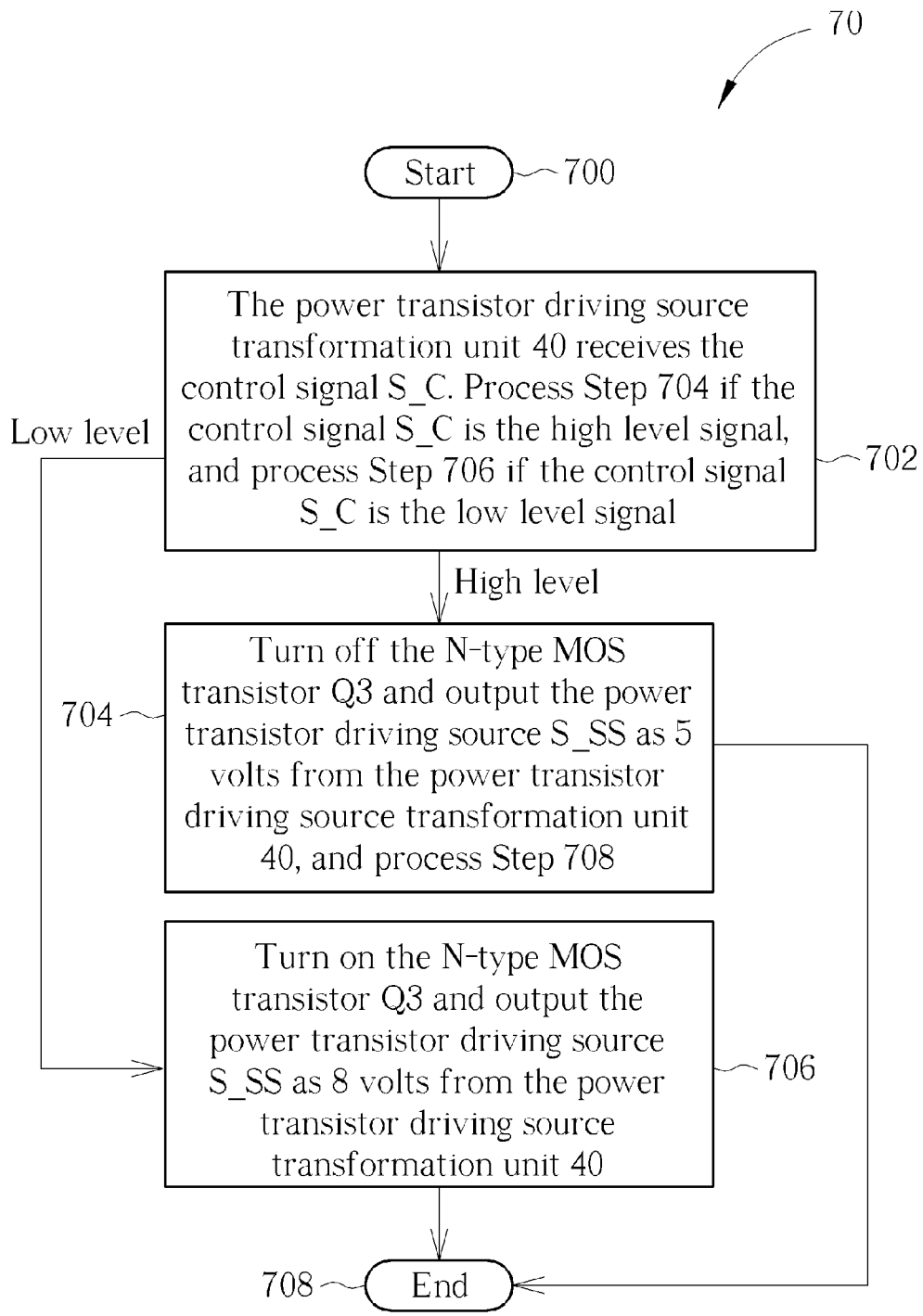
FIG. 7 illustrates a flow chart of a power transistor driving source transformation process according to an embodiment of the invention.

Further, operations of the power transistor driving source transformation unit 40 can be summarized as a power transistor driving source transformation process 70, as shown in FIG. 7. The power transistor driving source transformation process 70 includes the following steps.

Step 700: Start.

Step 702: The power transistor driving source transformation unit 40 receives the control signal S_C. Process Step 704 if the control signal S_C is the high level signal, and process Step 706 if the control signal S_C is the low level signal.

Step 704: Turn off the N-type MOS transistor Q3 and output the power transistor driving source S_SS as 5 volts from the power transistor driving source transformation unit 40, and process Step 708.

Step 706: Turn on the N-type MOS transistor Q3 and output the power transistor driving source S_SS as 8 volts from the power transistor driving source transformation unit 40.

Step 708: End.

The detailed operations of the power switch process 50, the system operational power source transformation process 60 and the power transistor driving source transformation process 70 can be understood from FIG. 1 to FIG. 4 and related paragraphs thereof, and are not described hereinafter. Additionally, the system operational power source transformation process 60 and the power transistor driving source transformation process 70 are processed via the control signal S_C, and those skilled in the art can provide other control signals to correspondingly control the system operational power source transformation unit 30 and the power transistor driving source transformation unit 40, which is also in the scope of the invention.

Moreover, the system operational power source transformation process 60 and the power transistor driving source transformation process 70 are designed for providing two switch voltage values, respectively, and those skilled in the art can adaptively modify related circuit layouts to pre-store a plurality of switch voltage values, or integrate the related circuit layouts with circuit layouts of the system operational power source transformation unit 30 as well as the power transistor driving source transformation unit 40. Also, transistor types of the system operational power source transformation unit 30 as well as the power transistor driving source transformation unit 40 and the control signals thereof can be adaptively modified for different requirements, which is not limiting the scope of the invention.

In summary, embodiments of the invention provide a power switch system and a method thereof for a computer system, which receives a feedback signal representing an operational mode of the computer system and accordingly, utilizes a power switch module to correspondingly adjust a system operational power source or a power transistor driving source. In that, every module/element of the computer system can be functionally operated to be switched between the sleep mode (with the basic operation) and the normal mode, so as to avoid unnecessary power consumption and increase power conversion efficiency for larger application range of the power switch system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power switch system for a computer system comprising:
   a power supply module for generating a system operational power source and a power transistor driving source according to an external power source;
   a control module for generating a control signal according to a feedback signal; and
   a power switch module comprising:
      a system operational power source transformation unit comprising a plurality of switch transistors for controlling conduction conditions of the plurality of switch transistors according to the control signal, so as to adjustably output the system operational power source to a power source module; and
      a power transistor driving source transformation unit comprising a switch transistor for controlling a conduction condition of a MOS transistor according to the control signal, so as to adjustably output the power transistor driving source to the power source module;
   wherein the feedback signal is utilized to determine an operational mode of the computer system to be a high performance operational mode or a power saving operational mode.

2. The power switch system of claim 1, wherein the feedback signal is derived from a processor, a graphic chip, a storage device, a power source module control chip or an external power source sensor to be utilized to determine whether the computer system is in the high performance operational mode or the power saving operational mode, so as to generate the control signal.

3. The power switch system of claim 2, wherein the processor, the graphic chip, the storage device, the power source module control chip or the external power source sensor further comprises a register for correspondingly storing the operational mode of the computer system.

4. The power switch system of claim 3, wherein the register is a power status register 32h, and the operational mode further comprises a P0 mode, a P1 mode, a P2 mode and a P3 mode.

5. The power switch system of claim 4, wherein when the operational mode is the P0 mode and the P1 mode, the control module determines the computer system to be in the high performance operational mode; when the operational mode is the P2 mode and the P3 mode, the control module determines the computer system to be in the power saving operational mode.

6. The power switch system of claim 5, wherein when the computer system is determined to be in the high performance operational mode, the feedback signal is a low level signal; when the computer system is determined to be in the power saving operational mode, the feedback signal is a high level signal.

7. The power switch system of claim 1, wherein when the control module determines the computer system to be in the high performance operational mode, the power switch module outputs the system operational power source as 12 volts and the power transistor driving source as 8 volts according to the control signal.

8. The power switch system of claim 1, wherein when the control module determines the computer system to be in the power saving operational mode, the power switch module outputs the system operational power source as 8 volts and the power transistor driving source as 5 volts according to the control signal.

9. The power switch system of claim 1, wherein the feedback signal is transmitted via an internal integrated circuit transmission interface, a serial peripheral interface, a power management bus, a system management bus or a SVID bus.

10. A power switch method for a computer system comprising:
   generating a system operational power source and a power transistor driving source according to an external power source;
   generating a control signal according to a feedback signal; and
   utilizing a power switch module for adjustably outputting the system operational power source and the power transistor driving source to a power source module;
   wherein the feedback signal is utilized to determine an operational mode of the computer system to be a high performance operational mode or a power saving operational mode; and
   wherein the power switch module further comprises:
      a system operational power source transformation unit comprising a plurality of switch transistors for controlling conduction conditions of the plurality of switch transistors according to the control signal, so as to adjustably output the system operational power source; and
      a power transistor driving source transformation unit comprising a switch transistor for controlling a conduction condition of a MOS transistor according to the control signal, so as to adjustably output the power transistor driving source.

11. The power switch method of claim 10, wherein the feedback signal is derived from a processor, a graphic chip, a storage device, a power source module control chip or an external power source sensor to be utilized to determine whether the computer system is in the high performance operational mode or the power saving operational mode, so as to generate the control signal.

12. The power switch method of claim 11, further utilizing a register of the processor, the graphic chip, the storage device, the power source module control chip or the external power source sensor for storing the operational mode of the computer system.

13. The power switch method of claim 12, wherein the register is a power status register 32 h, and the operational mode further comprises a P0 mode, a P1 mode, a P2 mode and a P3 mode.

14. The power switch method of claim 13, wherein when the operational mode is the P0 mode and the P1 mode, the control module determines the computer system to be in the high performance operational mode; when the operational mode is the P2 mode and the P3 mode, the control module determines the computer system to be in the power saving operational mode.

15. The power switch method of claim 14, wherein when the computer system is determined to be in the high performance operational mode, the feedback signal is a low level signal; when the computer system is determined to be in the power saving operational mode, the feedback signal is a high level signal.

16. The power switch method of claim 10, wherein when the control module determines the computer system to be in the high performance operational mode, the power switch module outputs the system operational power source as 12 volts and the power transistor driving source as 8 volts according to the control signal.

17. The power switch method of claim 10, wherein when the control module determines the computer system to be in the power saving operational mode, the power switch module outputs the system operational power source as 8 volts and the power transistor driving source as 5 volts according to the control signal.

18. The power switch method of claim 10, further utilizing an internal integrated circuit transmission interface, a serial peripheral interface, a power management bus, a system management bus or a SVID bus to transmit the feedback signal.

\* \* \* \* \*